Dec. 8, 1964 J. L. ENGLE 3,160,818

INTEGRATOR UTILIZING A BLOCKING OSCILLATOR CIRCUIT

Filed Dec. 22, 1961

INVENTOR
James L. Engle
BY
ATTORNEYS 3,160,818
Patented Dec. 8, 1964

3,160,818

INTEGRATOR UTILIZING A BLOCKING OSCILLATOR CIRCUIT

James L. Engle, New Lisbon, N.J., assignor, by mesne assignments, to the United States of America as represented by the United States Atomic Energy Commission Filed Dec. 22, 1961, Ser. No. 161,477
4 Claims. (Cl. 328—66)

The present invention relates to electric circuit integrators or analog computers which perform integration.

A purpose of the invention is to provide a very simple and effective electric circuit integrator which can receive current and discharge a pulse each time that a given amount of input current has been integrated.

A further purpose is to charge a condenser to a certain voltage and discharge the condenser and count the discharges of the condenser, the count being proportional to the time integral of the input current which charges the condenser.

A further purpose is to employ a blocking oscillator in which the control grid and the anode are inductively interconnected by a transformer, so that when the feedback loop is completed, the control grid for a very short integral of time assists conduction and then blocks it off, the blocking oscillator firing and producing a pulse which marks a given time integral of the input.

A further purpose is to employ a diode to open and close said feedback loop.

Further purposes appear in the specifications and in the claims.

In the drawings I have chosen to illustrate a few only of the numerous embodiments in which the invention may appear, selecting the forms shown from the standpoints of convenience in illustration, satisfactory operation and clear demonstration of the principles involved.

Figure 1:
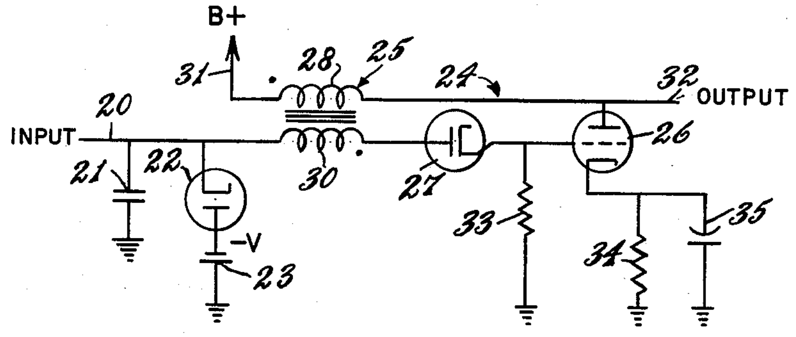
FIGURE 1 is a circuit diagram showing the device of the invention where the capacitor is charged negatively.

In the prior art there are various analog computers which perform integration. The present invention is a much simplified form of integrator or analog computer which receives input current and puts out a series of pulses to a counter, the number of which pulses are proportional to the time integral of the input current.

The invention employs a modification of a blocking oscillator in which the control grid and the anode of the blocking oscillator triode are inductively interconnected by a transformer and the anode aids conduction for a short time when the control grid begins to conduct and then blocks off conduction.

Considering now the drawing, there is shown an input 20 suitably from a current generator. It will be understood that the opposite side of the current generator is grounded. The current generator typically consists of a voltage source of suitable amplitude and a series resistor.

Connected across from the input to ground is an integrating capacitor 21.

The input 20 is also connected to the cathode of a clamping diode 22, the anode of which is connected to ground, through a suitable source of minus voltage 23.

A blocking oscillator 24 includes a blocking oscillator transformer 25, and a blocking oscillator triode 26. Unlike the blocking oscillators of the prior art a diode 27 is interposed in the feedback loop of the blocking oscillator.

The blocking oscillator transformer 25 has a primary 28 and a secondary 30 and has windings whose sense or direction is indicated by dots, as well known. A source of plus B voltage 31 is connected to one side of the transformer primary 28 and the other side of the transformer primary is connected to the anode of the blocking oscillator triode 26 and also to the output 32 which is connected to an electronic counter as later explained.

The secondary 30 of the blocking oscillator transformer 25 is connected as shown at one side of the input 20, the other side being connected to the anode of the diode 27.

The cathode of the diode 27 is connected to the control grid of the blocking oscillating triode 26 and to one side of the grid return resistor 33, the opposite side of which is grounded. The grid return resistor 33 keeps the control grid at ground potential during the off period. The cathode of the blocking oscillator triode 26 is connected to ground through parallel paths, one of which includes biasing resistor 34 and the other of which includes bypass capacitor 35.

In operation, it will be assumed for the purpose of discussion that the integrating capacitor 21 is charged to a voltage minus V, although the device will operate similarly if the integrating capacitor is initially charged to a voltage of zero and the circuit be slightly modified, as later explained.

Let us assume for the purpose of the following discussion that the integrating capacitor is initially charged to a voltage of minus V. When this integrating capacitor 21 is negative the diode 27 does not conduct. Even though the triode 26 is conducting the blocking oscillator cannot fire because its feedback path is incomplete or open.

An input current flows through the input 20 and charges the integrating capacitor 21 in a positive direction at a rate proportional to the current, the charging current on the capacitor appears on the anode of the diode 27 and eventually reaches a value where its voltage is higher than that of the control grid of triode 26. At this point diode 27 begins to conduct and the feedback path of triode 26 is closed or completed.

The charging voltage of the integrating capacitor 21 now appears on the control grid of the blocking oscillator triode 26, and the control grid voltage increases above the steady state value determined by the biasing resistor. Current in the primary 28 of the blocking oscillator transformer 25 increases and this has a reaction on the secondary 30 of the blocking oscillator transformer 25, which tends to further increase the voltage of the control grid of the blocking oscillator triode 26. This is a regenerative process.

The blocking oscillator therefore fires. This produces a pulse on output 32 which registers one unit on the decade counter (not shown) connected to output 32. In firing, heavy current from the blocking oscillator triode 26 passes through integrating capacitor 21 to ground, charging it again in the negative direction until its voltage reaches minus V.

After the voltage of the integrating capacitor reaches minus V, the clamping diode 22 passes the rest of the current to ground.

After the transformer saturates, typically in about five microseconds, the blocking oscillator returns to its steady state condition and the integrating capacitor is left with a charge of minus V and the procedure of integrating the input continues on its next cycle.

Each counter pulse thus represents a certain measured quantity of current which has been received at the input. The count of the pulses during a given time gives the integral over that time.

At the end of the measured time interval, to determine a fraction of a unit the voltage on the capacitor can be measured so as to add this correction to the final reading. In starting operation in the first place care is taken to add a sufficient charge to bring the integrating capacitor 21 to a voltage of minus V.

Figure 2:
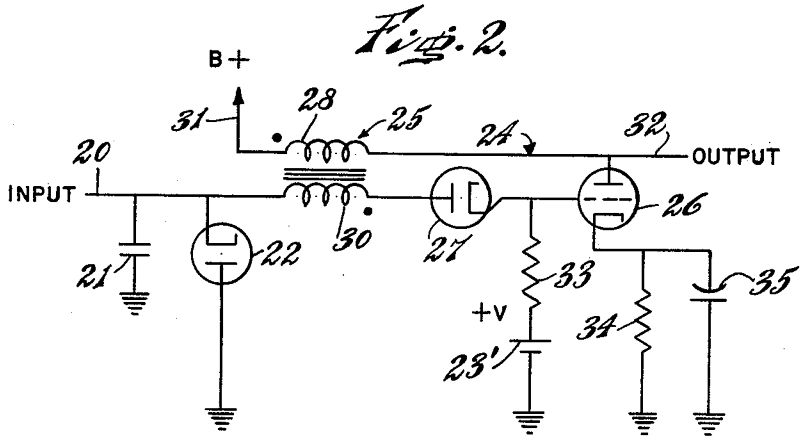
FIGURE 2 is a circuit diagram similar to FIGURE 1 showing the device of the invention intended for use where the capacitor is charged positively.

FIGURE 2 illustrates a circuit diagram intended to be used where the capacitor 21 is initialy charged to zero voltage and is subsequently charged positively.

The circuit diagram is similar to that of FIGURE 1 except that the source of minus V voltage which is interposed between the anode of clamping diode 22 and ground in FIGURE 1 is omitted in FIGURE 2 and a source of plus V voltage 23' is introduced between the grid return resistor 23 and ground, as shown.

The same principles apply in the operation of FIGURE 2 as in that of FIGURE 1, except that diode 27 does not start to conduct until integrating capacitor 21 has charged to a voltage of plus V, at which time the blocking oscillator 26 fires. Clamping diode 22 clamps the capacitor 21 to 0 volts at the time of firing. The resistor 34 in the cathode circuit of blocking triode 26 should in the case of FIGURE 2 have a higher value than that employed in the case of FIGURE 1 because returning the control grid of the triode 26 to plus V would otherwise increase quiescent current of the triode. The value of resistor 34 can readily be chosen to keep the triode current unchanged.

In view of my invention and disclosure variations and modifications to meet individual whim or particular need will doubtless become evident to others skilled in the art, to obtain all or part of the benefits of my invention without copying the structure shown, and I therefore, claim all such insofar as they fall within the reasonable spirit and scope of my claim.

Having thus described my invention what I claim as new and desire to secure by Letters Patent is:

1. In an integrator adapted to discharge a pulse each time that a given amount of input current has been integrated, said integrator including, input means adapted to receive a variable input current, an integrating capacitor connected across said input means, a blocking oscillator triode having a cathode, an anode and a control electrode, a blocking oscillator transformer having a primary and a secondary, said primary being connected at one side to said blocking oscillator triode anode, and said secondary being connected at one side to said input means and at the other side to said control electrode of the blocking oscillator triode, a source of positive voltage connected to the other side of said primary of the blocking oscillator transformer, output means connected to said anode of the blocking oscillator triode, a first diode having an anode and a cathode connected in series with said secondary of the blocking oscillator transformer and said control electrode of said blocking oscillator triode, said cathode of the first diode being electrically on the side of said first diode next to said control electrode of the blocking oscillator triode, a clamping diode connected in parallel with said integrating capacitor for the voltage of said integrating capacitor to be brought to a substantially fixed value lower than the voltage of said cathode of the first diode prior to each of the times that a given amount of input current is to be integrated by said capacitor, and means connected with said cathode of said first diode for maintaining said cathode of said first diode at a substantially fixed potential until the end of each time said integrating capacitor integrates a given amount of input current and becomes conductive through said first diode to said control electrode of the blocking oscillator triode.

2. In an integrator as set forth in claim 1, wherein said means for maintaining said cathode of said first diode at a fixed potential until the end of each time said integrating capacitor integrates a given amount of input current, includes a ground connection to said cathode of said first diode.

3. In an integrator as set forth in claim 2, wherein there is a battery having a negative terminal connected to the anode of said clamping diode and having a positive terminal grounded for the voltage of said integrating capacitor to be brought to a substantially fixed value lower than the voltage of said cathode of the first diode prior to each of the times that a given amount of input current is to be integrated by said capacitor.

4. In an integrator as set forth in claim 2, wherein said ground connection includes a battery having a positive terminal connected with said cathode of the first diode and said battery having a negative terminal grounded, and the anode of said clamping diode has a ground connection for the voltage of said integrating capacitor to be brought to a substantially fixed value lower than the voltage of said cathode of the first diode prior to each time that a given amount of input current is to be integrated by said capacitor.

References Cited by the Examiner

UNITED STATES PATENTS

| | | | |
|---|---|---|---|
| 2,161,948 | 6/39 | Bull et al. | 331—149 |
| 2,907,919 | 10/59 | Sonnenfeldt | 331—149 |
| 3,121,803 | 2/64 | Watters | 331—112 |

ARTHUR GAUSS, *Primary Examiner.*